(12) United States Patent
Steed

(10) Patent No.: US 7,096,583 B2
(45) Date of Patent: Aug. 29, 2006

(54) SYSTEM AND METHOD OF PRODUCING EXHAUST AND OTHER TYPES OF MANIFOLD

(76) Inventor: Leen David Steed, 8751 33Av NW, Calgary, Alberta (CA) T3B 1M2

( * ) Notice: Subject to any disclaimer, the term of this patent is extended or adjusted under 35 U.S.C. 154(b) by 332 days.

(21) Appl. No.: 10/652,301

(22) Filed: Sep. 2, 2003

(65) Prior Publication Data
US 2004/0045164 A1 Mar. 11, 2004

(51) Int. Cl.
B21D 51/16 (2006.01)
B21D 51/38 (2006.01)
B23P 13/04 (2006.01)
F02M 35/10 (2006.01)

(52) U.S. Cl. .............. 29/890.08; 29/890.052; 29/557; 123/184.21

(58) Field of Classification Search .......... 29/890.08, 29/557, 558, 463, 890.052; 60/605.3, 685, 60/687, 281, 290, 315; 123/184.41, 184.21, 123/568.15; 18/309, 296
See application file for complete search history.

(56) References Cited

U.S. PATENT DOCUMENTS

| | | | | | |
|---|---|---|---|---|---|
| 2,713,195 | A | * | 7/1955 | Hemmer | 29/890.052 |
| 4,790,472 | A | * | 12/1988 | Bunkoczy | 29/463 |
| 5,784,882 | A | * | 7/1998 | Bonny et al. | 60/323 |
| 6,474,697 | B1 | * | 11/2002 | Nording et al. | 29/890.052 |

* cited by examiner

Primary Examiner—Marc Jimenez
Assistant Examiner—Douglas E. Mazzuca, Jr.

(57) ABSTRACT

This invention provides an improved system and method for producing manifolds such as those used to direct exhaust gasses from an internal combustion engine into a turbocharger. The manifold is made from two or more pieces which are machined in such a way as to create passageways when the separate pieces are assembled together. The method is much faster and easier to produce than present methods and allows for improved accuracy. The ability to machine these manifolds using computer controlled machines will lower costs and improve quality.

1 Claim, 4 Drawing Sheets

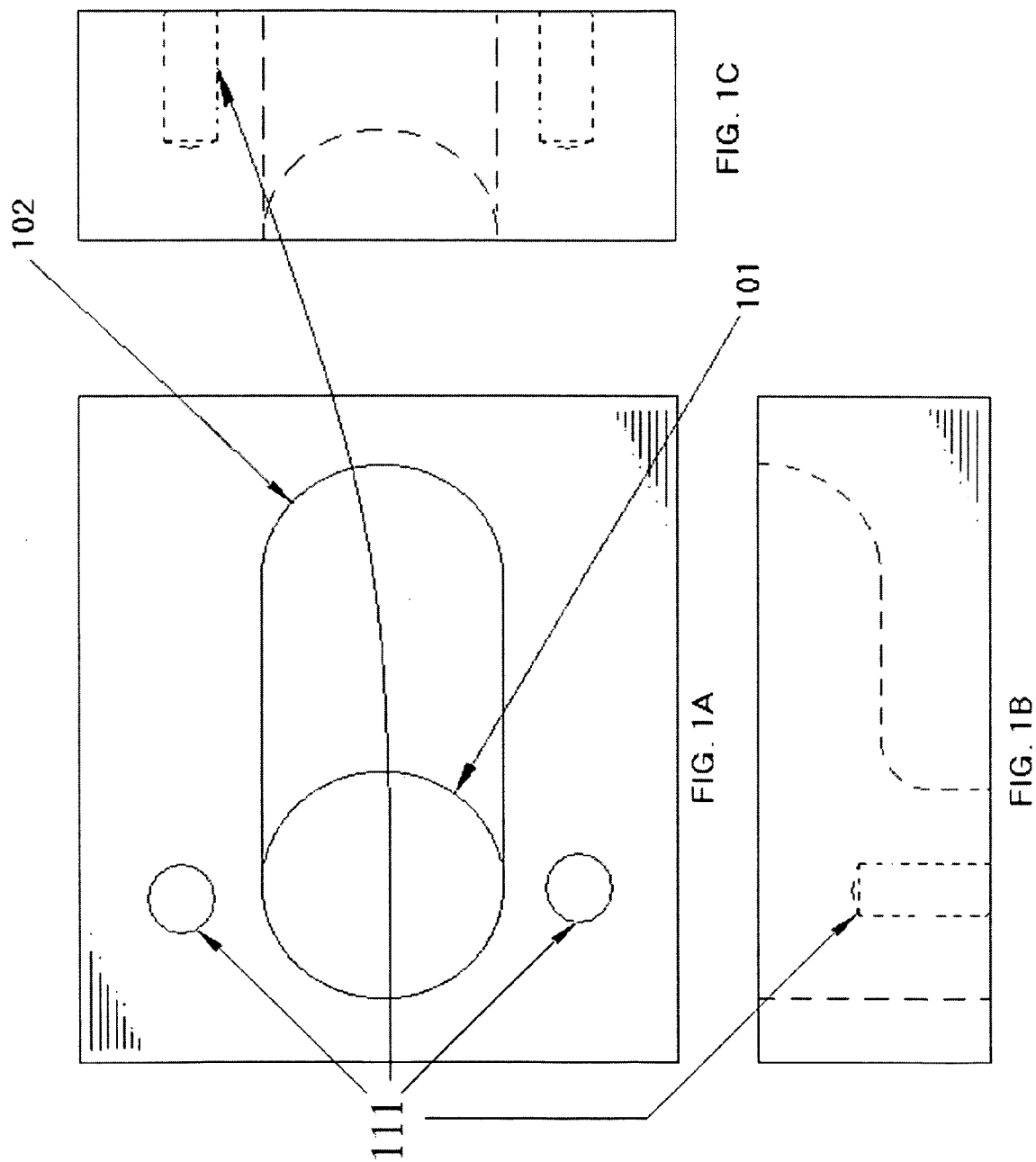

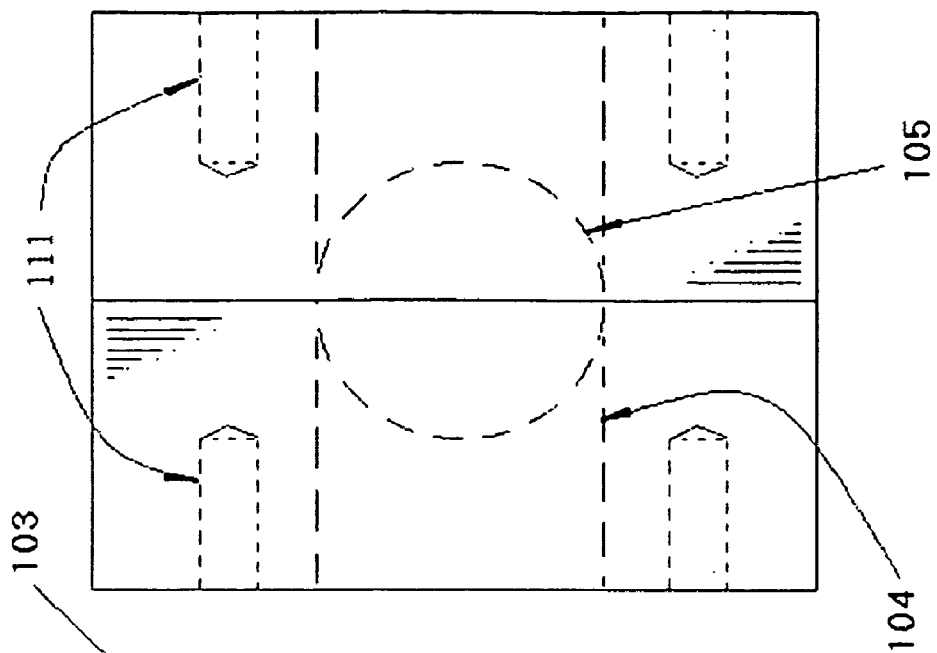
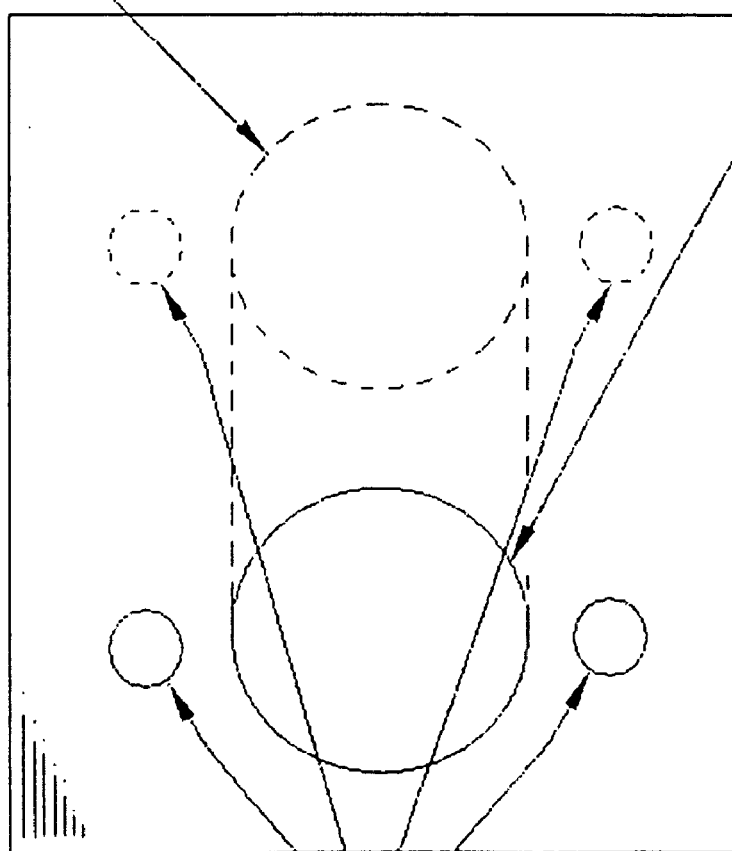
FIG. 2A
FIG. 2B

SYSTEM AND METHOD OF PRODUCING EXHAUST AND OTHER TYPES OF MANIFOLD

BACKGROUND

In recent years the addition of a turbocharger has become popular as a means for boosting the power of internal combustion engines. To this end, many auto makers have tried turbo charging to extract more power from small engines. These manufacturers have typically used the economies of volume production to make it feasible to have exhaust manifolds cast by the thousand to direct exhaust gasses to the turbocharger turbine wheel. These manifolds were generally quite acceptable in use but were not usually the best design to extract the highest performance possible. The casting process left a rough internal finish which restricted the flow of exhaust gasses.

There is also a large demand for turbo manifolds which can be fitted to engines which were either supplied without turbo's or, were supplied with poorly designed manifolds which could be exchanged for an after market manifold for improved performance. These after market manifolds are usually constructed using a flat steel plate type flange which bolts to the cylinder head of the engine. The plate has holes in it which correspond with the exhaust ports of the engine. Welded to this flange plate are steel pipes which direct the exhaust gasses away from the cylinder head exhaust ports and into a common collection area. This collection area has a flange at its exhaust end which is configured to match the bolt pattern of the turbo charger inlet. The combined gasses from all the cylinders are routed via this flange, into the turbocharger turbine inlet. These welded pipe style manifolds are free flowing but difficult and expensive to construct. Due to the thin metal used in their construction these manifolds are also prone to failure when under the stress of the intense heat generated in a turbo charged engines exhaust system. These manifolds require many separate components to produce and require a great deal of skilled welding.

Those skilled in the art will recognize that an improved system and method for producing turbocharger manifolds would have many applications for internal combustion engines.

SUMMARY OF THE INVENTION

It is therefore the object of this invention to provide a system and method for producing manifolds which is faster, cheaper and easier to manufacture than present systems.

It is the further object of the present invention to provide such a system and method that provides for increased accuracy of the manifold and superior durability than present systems.

The present invention provides a system for producing manifolds for any purpose though it is primarily intended for the production of turbocharger manifolds. The manifolds comprise of two or more thick metal plate sections which are machined to create channels in their surfaces. These channels are machined in such a way as to mate with one another. The resulting channels combine to create a passageway between the plates when said plates are secured against one another. These channels can be accessed from the external surfaces of the assembly via drilled ports through the plates which meet with the internal passages created by the combined channels.

The preferred method for machining would be to use a CNC (computer numerically controlled) milling machine. Such a machine can perform all the tasks required to create each section of the manifold and this is how most of the production cost is saved.

DESCRIPTION OF DRAWINGS

The following drawings show a sample embodiment of the invention. The drawings show a manifold which has an inlet on one side and an outlet which is substantially offset from the inlet.

FIGS. 1, a,b and c show front, side and top views of an embodiment of the invention. This shows one half of the proposed assembly comprising an inlet/outlet port at 101 and a milled channel at 102. (mounting holes for cylinder head and turbo mounting holes shown at 111 FIGS. 2A, 1A & 1B) Two of these components are required for a complete manifold assembly.

FIGS. 2A and 2B show a top and side view of the completed assembly of the two (mounting holes for cylinder head and turbo mounting holes shown at 111 FIGS. 2A, 1A & 1B) components which are made to the specification in FIG. 1

DETAILED DESCRIPTION OF THE EMBODIMENT

The invention is a system for producing manifolds from multiple layered, mating components. Each said part has an outer surface which mates with ports on a mechanism and has channels machined into its opposite surface which match a similar channel on another manifold section. The combined manifold sections close together to create a passageway from the mechanism which can exit from any location on the assembled manifold via a machined hole through the manifold section which can be adjacent or unadjacent to the mechanism.

Figure 3:
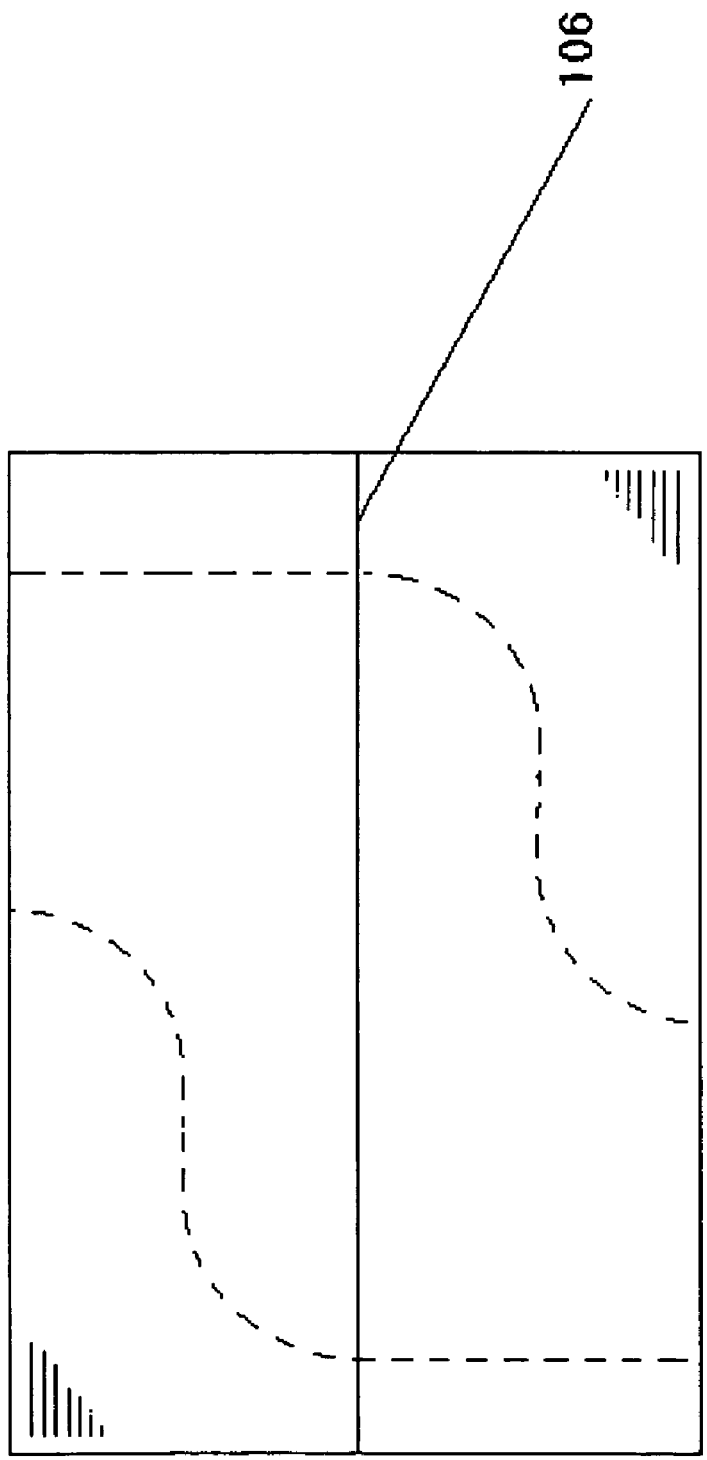
FIG. 3 shows another side view of the assembly detailed in FIGS. 2A and 2B, This shows clearly the method for creating an offset between inlet and outlet ports.
Figure 4:
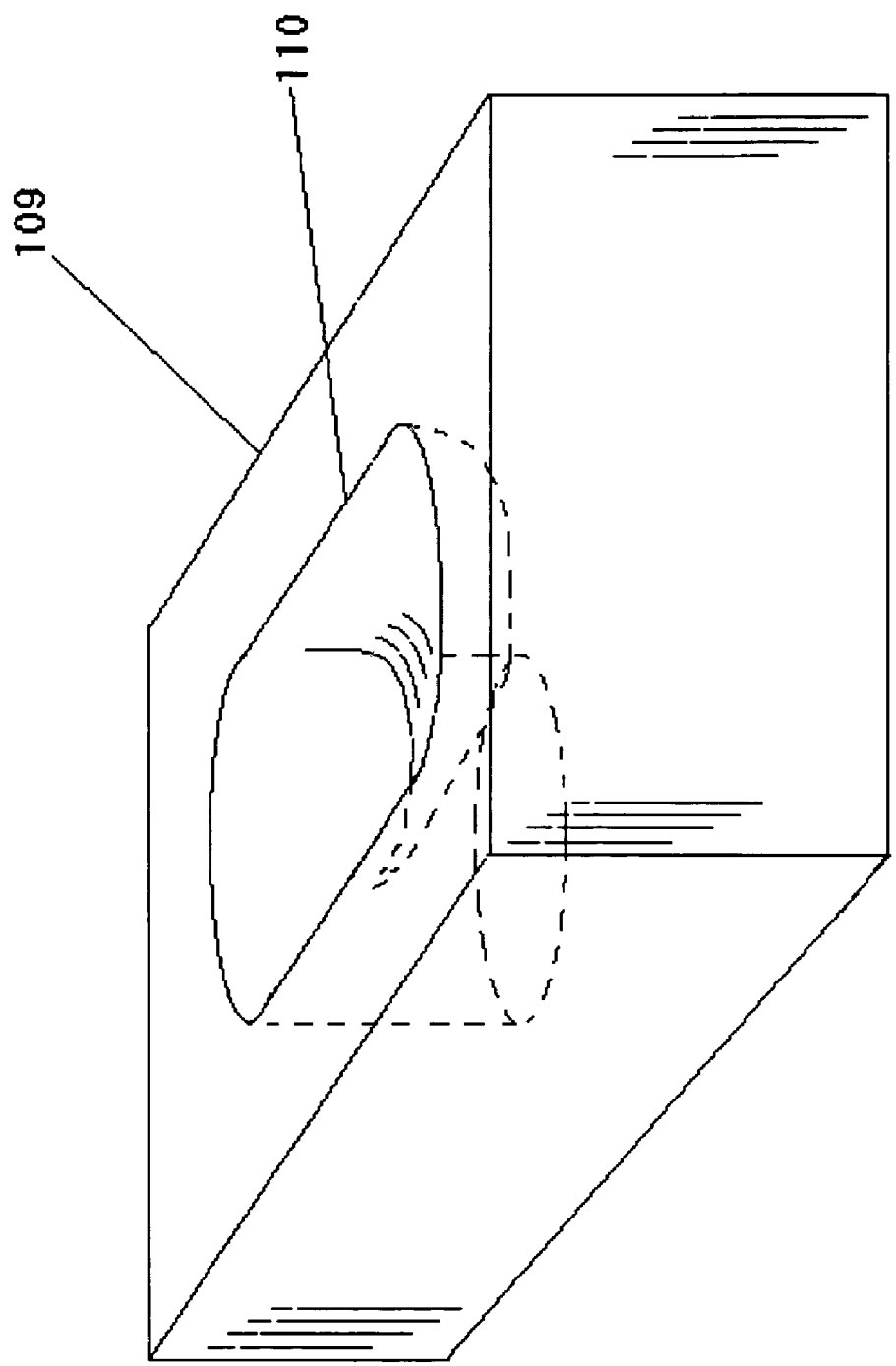
FIG. 4 shows a perspective view of the component in FIG. 1

FIGS. 2A 2B and FIG. 3 show one preferred embodiment of the invention. Identical manifold halves are joined at split line 106 by welding or by removable fasteners. The resulting assembly creates a manifold which has an inlet at 104 and an outlet at 103.

A passage is created at 105 which is perpendicular to the inlet and outlet ports.

The present invention further provides a method of producing manifolds comprising the steps of securing one part of a manifold to a machine table, using cutting tools to machine ports and channels in said part, securing a second part of a manifold to a machine table and using cutting tools to machine ports and channels which will mirror and match those of the aforementioned part. Fastening the two components together to create a manifold comprising an outer surface attachable to a mechanism, an internal passage to guide the flow of liquid or gas, and an outlet to the external surface of said manifold assembly. (cutting the appropriate mounting holes into the outer surface which is to be attached to the cylinder head of an internal combustion engine; again using milling cutters and drills held in the spindle of a computer controlled milling machine, cutting the appropriate mounting holes into the outer surface which is to be attached to a turbo charger or exhaust pipe as shown at 111 FIGS. 2A, 1A & 1B)

Thus it can be seen that the invention accomplishes all of it's stated objectives. The foregoing is considered as illustrative only of the principles of the invention. further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the described invention.

I claim:

1. A method for producing exhaust manifolds comprising the steps of: securing one part of a two-part manifold to a computer controlled milling machine table; Using milling cutters of various types to cut channels into the surface of the component, said channels will form part of the exhaust passageway of a complete manifold; Repeating the steps above to create a second part to mate with the first part to form a complete manifold;

Aligning and fastening the two halves of the manifold together using either welding or removable fasteners; securing the assembled components to a milling machine table; using milling cutters and drills held in the spindle of a computer controlled milling machine; cutting the appropriate mounting holes into the outer surface which is to be attached to the cylinder head of an internal combustion engine; again using milling cutters and drills held in the spindle of a computer controlled milling machine, cutting the appropriate mounting holes into the outer surface which is to be attached to a turbo charger or exhaust pipe.

* * * * *